United States Patent
Yang et al.

(10) Patent No.: US 10,145,350 B2
(45) Date of Patent: Dec. 4, 2018

(54) APPARATUS AND METHOD FOR CONTROLLING VEHICLE STARTUP

(71) Applicants: HYUNDAI MOTOR COMPANY, Seoul (KR); KIA MOTORS CORPORATION, Seoul (KR)

(72) Inventors: Sung Ho Yang, Ansan-si (KR); Jae Young Shim, Yongin-si (KR); Young Pin Jin, Yongin-si (KR); Kang Sik Jeon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/703,059

(22) Filed: Sep. 13, 2017

(65) Prior Publication Data

US 2018/0171960 A1    Jun. 21, 2018

(30) Foreign Application Priority Data

Dec. 16, 2016   (KR) ........................ 10-2016-0173032

(51) Int. Cl.
| | |
|---|---|
| *F02N 11/08* | (2006.01) |
| *F02D 41/26* | (2006.01) |

(52) U.S. Cl.
CPC .......... *F02N 11/0862* (2013.01); *F02D 41/26* (2013.01); *F02N 2200/063* (2013.01)

(58) Field of Classification Search
CPC ................. F02N 11/08; F02N 11/0862; F02N 2200/063; F02D 41/26
See application file for complete search history.

(56) References Cited

U.S. PATENT DOCUMENTS 5,450,304 A * 9/1995 Cox ...................... H02J 7/1446
363/21.05

FOREIGN PATENT DOCUMENTS

KR    10-2016-0055634 A    5/2016

* cited by examiner

*Primary Examiner* — Hieu T Vo
(74) *Attorney, Agent, or Firm* — McDermott Will & Emery LLP

(57) ABSTRACT

An apparatus and a method for controlling vehicle start-up modify a sequence order in which control units of the vehicle are started up to improve reliability. In operation, a processor determines whether a voltage of a low-voltage battery is less than a reference voltage when a start key is turned on, and determines a voltage classification level corresponding to the voltage of the low-voltage battery when the voltage of the low-voltage battery is less than or equal to the reference voltage. The processor then determines a sequence order in which to start up driving units of the vehicle including a power conversion device of the vehicle based on the determined voltage classification level, and controls startup of the vehicle by reflecting the determined sequence order of the power conversion device.

25 Claims, 8 Drawing Sheets

| CLASSIFICATION | DRIVING UNIT | AVERAGE OF VOLTAGE DROP OF N TIMES OF RECENT STARTUP | | AVERAGE VALUE |
|---|---|---|---|---|
| | | AVERAGE OF (N-1) TIMES | UPDATE VALUE | |
| ⓐ | HYDROGEN TANK ON | ⓐ_Old | ⓐ_New | 0.2V |
| ⓑ | ACV OPEN | ⓑ_Old | ⓑ_New | 0.1V |
| ⓒ | ELECTRIC PUMP DRIVE | ⓒ_Old | ⓒ_New | 0.2V |
| ⓓ | HYDROGEN SUPPLY VALVE ON | ⓓ_Old | ⓓ_New | 0.1V |
| ⓔ | HYDROGEN PURGE VALVE ON | ⓔ_Old | ⓔ_New | 0.1V |
| ⓕ | HYDROGEN PRESSURE CONTROL VALVE ON | ⓕ_Old | ⓕ_New | 0.1V |
| | SUM | | | 0.8V |

FIG.3

| CLASSIFICATION | VOLTAGE RANGE | EX VOLTAGE RANGE |
|---|---|---|
| Level1 | $V_{Ref} - ⓕ < V \leq V_{Ref}$ | $10.4V < V \leq 10.5V$ |
| Level2 | $V_{Ref} - (ⓓ+ⓔ+ⓕ) < V \leq V_{Ref} - ⓕ$ | $10.2V < V \leq 10.4V$ |
| Level3 | $V_{Ref} - (ⓑ+ⓒ+ⓓ+ⓔ+ⓕ) < V \leq V_{Ref} - (ⓓ+ⓔ+ⓕ)$ | $9.9V < V \leq 10.2V$ |

FIG.4

| SEQUENCE NUMBER | STARTUP SEQUENCE | USE OF 12V |
|---|---|---|
| 1 | KEY ON | |
| 2 | START | |
| 3 | HYDROGEN TANK ON | O |
| 4 | BMS PRECHARGE | |
| 5 | BHDC BOOST | |
| 6 | BHDC_RUN | |
| 7 | [EXISTING] EV STARTUP, READY ACV OPEN | |
| 8_1 | ACV OPEN | O |
| 8_2 | ELECTRIC PUMP DRIVE | O |
| 9 | HYDROGEN SUPPLY VALVE ON | O |
| 10 | HYDROGEN PURGE VALVE ON | O |
| 11 | HYDROGEN PRESSURE CONTROL VALVE ON | O |
| 12 | [EXISTING] LDC DRIVE | |
| 13 | STACK RELAY ON | O |
| 14 | HYDROGEN RECIRCULATION BLOWER DRIVE | O |
| 15 | AIR BLOWER DRIVE | |
| 16 | STACK VOLTAGE RISE | |
| 17 | FUEL CELL START COMPLETION | |

LEVEL3 → 8_1
LEVEL2 → 8_2
LEVEL1 → 11
LDC DRIVE → 12

FIG.5

APPARATUS AND METHOD FOR CONTROLLING VEHICLE STARTUP

CROSS-REFERENCE TO RELATED APPLICATION

This application is based on and claims the benefit of priority to Korean Patent Application No. 10-2016-0173032, filed on Dec. 16, 2016, with the Korean Intellectual Property Office, the entire disclosure of which is incorporated herein by reference.

TECHNICAL FIELD

The present disclosure relates to an apparatus and a method for controlling vehicle startup.

BACKGROUND

A fuel cell vehicle is driven by using electricity generated from a fuel cell stack serving as a main energy source. Such a fuel cell vehicle is additionally equipped with a high-voltage battery, such as a battery used for a hybrid electric vehicle (HEV), that serves as an auxiliary energy source for driving the fuel cell at the initial stage of start-up.

Conventionally, in the start-up process of a fuel cell vehicle, both an electric vehicle (EV) start-up operation (such as an operation used for driving a vehicle with only a high-voltage battery) and a fuel cell (FC) start-up (such has an operation used for driving a fuel cell) are performed at the same time. In this case, a battery having the same specification as a low-voltage battery (e.g., a 12 V battery of an internal combustion engine vehicle) is used for the driving power of the operating controllers used during the start-up operation and of the power supply for various kinds of valves (hydrogen supply valve, etc.). When the performance of such a low-voltage battery is lowered to a certain level or less, the low-voltage battery is rapidly degraded to a level at which the fuel cell vehicle cannot be started, as in the case of an internal combustion engine vehicle.

SUMMARY

An object of the present disclosure is to provide an apparatus and a method for controlling vehicle startup, which can adjust a startup time point of a power conversion device (LDC) in a sequence of startup time points of driving units of the vehicle based on the voltage level of a low-voltage battery and compensate for an increase in startup time by driving the LDC at the adjusted startup time point.

The technical problems to be solved by the present inventive concept are not limited to the aforementioned problems, and any other technical problems not mentioned herein will be clearly understood from the following description by those skilled in the art to which the present disclosure pertains.

To achieve the object, according to one aspect of the present disclosure, there is provided an apparatus for controlling vehicle start-up, which includes a vehicle communication interface and a processor. The vehicle communication interface supports communication between a vehicle controller and components of a vehicle. The processor is communicatively connected to the vehicle communication interface and is configured to determine, based on low-voltage battery information received through the vehicle communication interface, whether a voltage of a low-voltage battery is less than or equal to a reference voltage when a start key is turned on. The processor further determines a voltage classification level corresponding to the voltage of the low-voltage battery when the voltage of the low-voltage battery is less than or equal to the reference voltage, and determines a driving time point of a power conversion device based on the determined voltage classification level. The processor then controls startup of the vehicle in accordance with the determined driving time point of the power conversion device.

The processor may determine the voltage classification level of the low-voltage battery by comparing a voltage drop amount of each of a plurality of driving units of the vehicle driven ahead of the power conversion device in a reference startup sequence with the voltage of the low-voltage battery when the voltage of the low-voltage battery is less than the reference voltage.

The processor may determine the voltage classification level of the low-voltage battery by comparing a voltage range in a voltage level/classification table defined based on the voltage drop amount of each of the plurality of driving units with the voltage of the low-voltage battery.

The voltage level/classification table may include two or more voltage ranges determined based on a result of learning the voltage drop amount of each driving unit, and the voltage level/classification table associates voltage levels/classifications with each of the two or more voltage ranges.

When the vehicle is attempted to be started based on the determined voltage classification level, the processor may set the voltage classification level of the low-voltage battery to a voltage classification level corresponding to a lower voltage range when it is determined that startup of the vehicle has failed.

The processor may set a driving sequence order of the power conversion device defined in the reference startup sequence, based on the driving time point of the power conversion device determined based on the voltage classification level.

Each driving unit may be driven by using power of the low-voltage battery when the vehicle starts up.

The processor may control driving of each driving unit and the power conversion device based on a sequence order defined in a reference startup sequence when the voltage of the low-voltage battery is higher than the reference voltage.

The processor may be further configured to learn a voltage drop amount of each driving unit by calculating an average voltage drop amount associated with startup of each driving unit while the vehicle starts up over a predetermined number of times to learn a voltage drop amount of each driving unit.

The processor may determine the voltage drop amount of each driving unit that is driven at each startup of the vehicle and compute the average voltage drop amount of each driving unit by reflecting the determined voltage drop amount of each driving unit on the previously learned voltage drop amount of each driving unit when the startup of the vehicle is completed based on the reference start sequence.

According to another aspect of the present disclosure, there is provided a method of controlling vehicle start-up, which includes steps of determining, by a processor communicatively connected to a vehicle communication interface supporting communication between a vehicle controller and components of a vehicle, whether a voltage of a low-voltage battery is less than or equal to a reference voltage when a start key is turned on. The processor further determines a voltage classification level corresponding to the voltage of the low-voltage battery when the voltage of the low-voltage battery is less than or equal to the reference voltage, and determines a driving time point of a power conversion device based on the determined voltage classification level. The processor additionally controls startup of the vehicle in accordance with the determined driving time point of the power conversion device.

According to a further aspect of the present disclosure, a method for controlling start-up of a vehicle includes receiving, in a processor through a vehicle communication interface, a voltage measurement of a low-voltage battery of the vehicle. A sequence order for startup of driving units of the vehicle is adjusted in the processor based on the received voltage measurement, and startup of the driving units of the vehicle is controlled in the adjusted sequence order by the processor through the vehicle communication interface.

BRIEF DESCRIPTION OF THE DRAWINGS

The above and other objects, features and advantages of the present disclosure will be more apparent from the following detailed description taken in conjunction with the accompanying drawings:

FIGS. 2 to 5 are tables illustrating data structures associated with an apparatus for controlling vehicle start-up according to an embodiment of the present disclosure;

DETAILED DESCRIPTION

Figure 1:
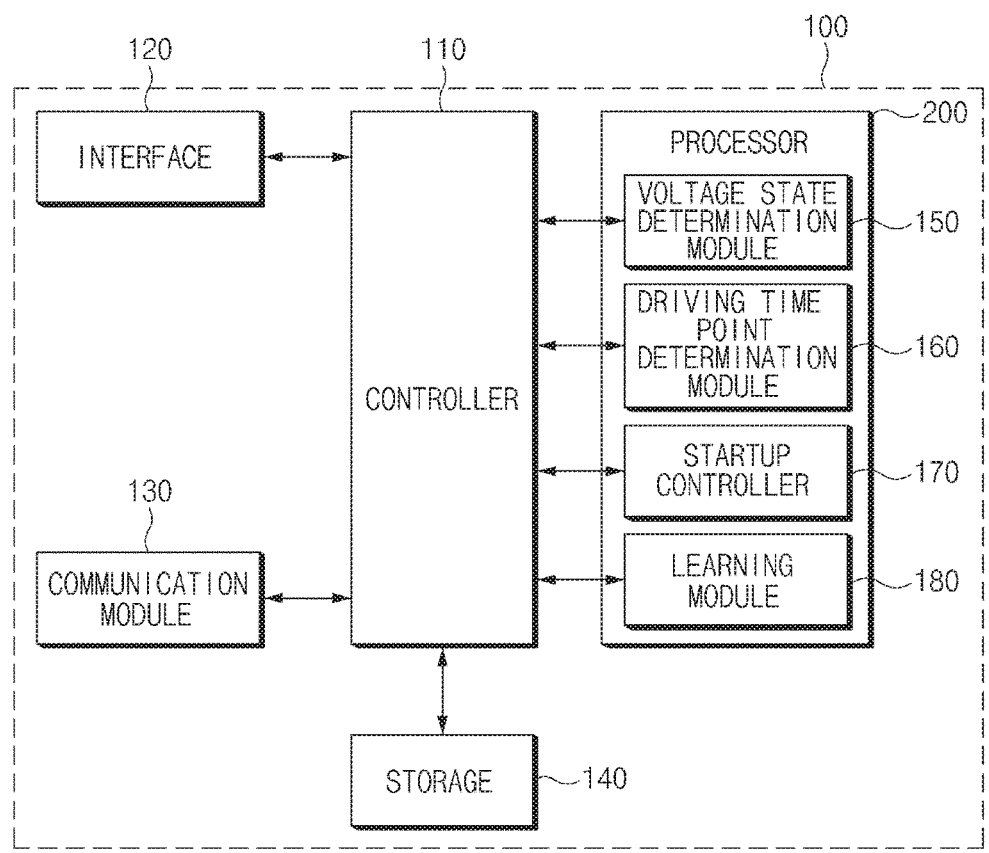
FIG. 1 is a block diagram illustrating a configuration of an apparatus for controlling vehicle start-up according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions may be omitted in order not to unnecessarily obscure the gist of the present disclosure.

In describing various components in the present disclosure, terms like first, second, "A", "B", (a), and (b) may be used. These terms are intended solely to distinguish one component from another, and the terms do not limit the nature, sequence, or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus for controlling vehicle start-up according to an embodiment of the present disclosure may be applied to a fuel cell vehicle and may be applied to a hybrid electric vehicle (HEV) or an electric vehicle (EV) that starts up using a low-voltage battery. The embodiments of the present disclosure will be described by taking the case where an apparatus for controlling vehicle start-up is applied to a fuel cell vehicle as an example, but is not limited thereto.

FIG. 1 is a block diagram showing an illustrative apparatus for controlling vehicle start-up according to an embodiment of the present disclosure.

An apparatus 100 for controlling vehicle start-up (hereinafter, referred to as 'a startup control apparatus') according to the present disclosure may be provided in a vehicle. In this case, the startup control apparatus 100 may be integrated within control units in the vehicle, or may be implemented as a separate apparatus and may be connected to control units of the vehicle through separate connecting wires, links, or other means. The startup control apparatus 100 may be operated in conjunction with various driving units of the vehicle and a low-voltage battery of a vehicle. In addition, the startup control apparatus 100 may be operated in conjunction with control units for controlling driving units.

Referring to FIG. 1, the startup control apparatus 100 may include a controller 110, an interface 120 (e.g., an input/output I/O interface), a vehicle communication module 130 (e.g., a communication interface), a storage 140 (e.g., a memory), and a processor 200 including a voltage state determination module 150, a driving time point determination module 160, a startup controller 170, and a learning module 180. In this case, the controller 110 and processor 200 may process signals transmitted between the components of the startup control apparatus 100.

In some embodiment, one or more of the voltage state determination module 150, the driving time point determination module 160, the startup controller 170, and the learning module 180 are implemented using one or more processor(s) 200. The modules 150, 160, 170 and 180 can be implemented with software instructions stored in non-transitory memory which, when executed on the processor(s) 200, provide the function(s) associated with each module as described in further detail below. The processor(s) 200 may include a same processor used to implement the controller 110, or one or more processors separate from controller 110 and communicatively connected thereto.

The interface 120 may be an input and/or output interface (e.g., an input/output (I/O) interface) that includes input means for receiving a control instruction from a user (e.g., a user input interface) and output means for outputting an operation state and result of the startup control apparatus 100 (e.g., a user output interface).

In this case, the input interface or means may include a user input interface key or button, and may include a mouse, a joystick, a jog or shuttle dial, a stylus pen, and the like. In addition, the input interface or means may include a soft key implemented on a display.

The output interface or means may include a display. The output interface or means may additionally or alternatively include a voice or audio output means such as a speaker. In this case, when a touch sensor such as a touch film, a touch sheet, a touch pad, and the like is provided on the display for receiving user input (e.g., as part of the input interface), the display may operate as a touch screen, and may thereby provide an integrated form of input/output interface or means.

The display may include at least one of a liquid crystal display (LCD), a thin film transistor liquid crystal display (TFT LCD), an organic light-emitting diode (OLED), a flexible display, a field emission display (FED), and a three-dimensional (3D) display.

The vehicle communication module 130 provides a communication interface or communication port which supports communication with electric components and/or driving units provided in a vehicle. As an example, the vehicle communication module 130 may receive operation information from a key unit, a hydrogen tank, an air cutoff valve (ACV), an electric pump, a hydrogen supply valve, a hydrogen purge valve, a hydrogen pressure control valve, and the like provided in a vehicle, and may receive voltage drop information as each driving unit is operated. In addition, the vehicle communication module 130 may receive power information from a low-voltage battery provided in a vehicle. The vehicle communication module 130 may receive the power information from the low-voltage battery in the form of analog voltage signal having a voltage value equal to that of the battery voltage or in the form of a data signal indicative of the battery voltage, for example.

The vehicle communication module 130 may include a network interface, network transceiver, or other module that supports communications across a vehicle network such as controller area network (CAN) communication, local interconnect network (LIN) communication, flex-ray communication, and the like.

Meanwhile, the vehicle communication module 130 may include a transceiver, interface, or module for wireless Internet access or a transceiver, interface, or module for short range communication.

The storage 140 (e.g., a memory such as a non-transitory memory) may store data and/or algorithms necessary to operate the startup control apparatus 100.

The storage 140 may store a default startup sequence. In addition, the storage 140 may store voltage drop learning information of the driving units operating at a startup time, a voltage level/classification defined based on a voltage state of the low-voltage battery, and LDC driving information based on the voltage level/classification. In this case, the voltage drop learning information may store data on an average (or measured) drop in voltage observed upon startup of each driving unit. Additionally, the voltage level/classification based on the voltage state of the low-voltage battery and the LDC driving information may be stored in the form of a voltage level/classification table providing a respective voltage level/classification for each of a plurality of different associated voltage states (or ranges) of the low-voltage battery.

In addition, the storage 140 may store instructions and/or algorithms for execution on a processor to cause the processor to variably control the LDC driving time point based on the voltage level of the low-voltage battery. The LDC driving time point may identify the time (or sequence point) at which the LDC is driven in an ordered sequence in which driving units of the vehicle are activated or driven, and the LDC driving point may thus determine whether the LDC is before or after other driving units in the ordered sequence.

In this case, the storage 140 may include a storage medium such as a random access memory (RAM), a static random access memory (SRAM), a read-only memory (ROM), a programmable read-only memory (PROM), an electrically erasable programmable read-only memory (EEPROM), or the like.

The voltage state determination module 150 determines a voltage state of the low-voltage battery based on information received through the vehicle communication module 130 when the start key is turned on (e.g., based on battery information identifying a voltage of the low-voltage battery, such as a battery information signal output by an analog-to-digital converter measuring an output voltage of the battery). In this case, the voltage state determination module 150 determines whether the voltage (V) of the low-voltage battery is less than a predetermined reference voltage ($V_{Ref}$).

When the voltage (V) of the low-voltage battery is equal to or higher than the predetermined reference voltage ($V_{Ref}$), the voltage state determination module 150 transmits the determination result to the startup controller 170.

Thus, the startup controller 170 controls startup in accordance with a predefined reference startup sequence. In this case, the startup controller 170 controls driving of each driving unit in the order predefined by the reference startup sequence and controls driving of the power conversion device (LDC).

Hereinafter, the reference startup sequence will be described with reference to the embodiment illustrated in FIG. 2.

Figure 2:
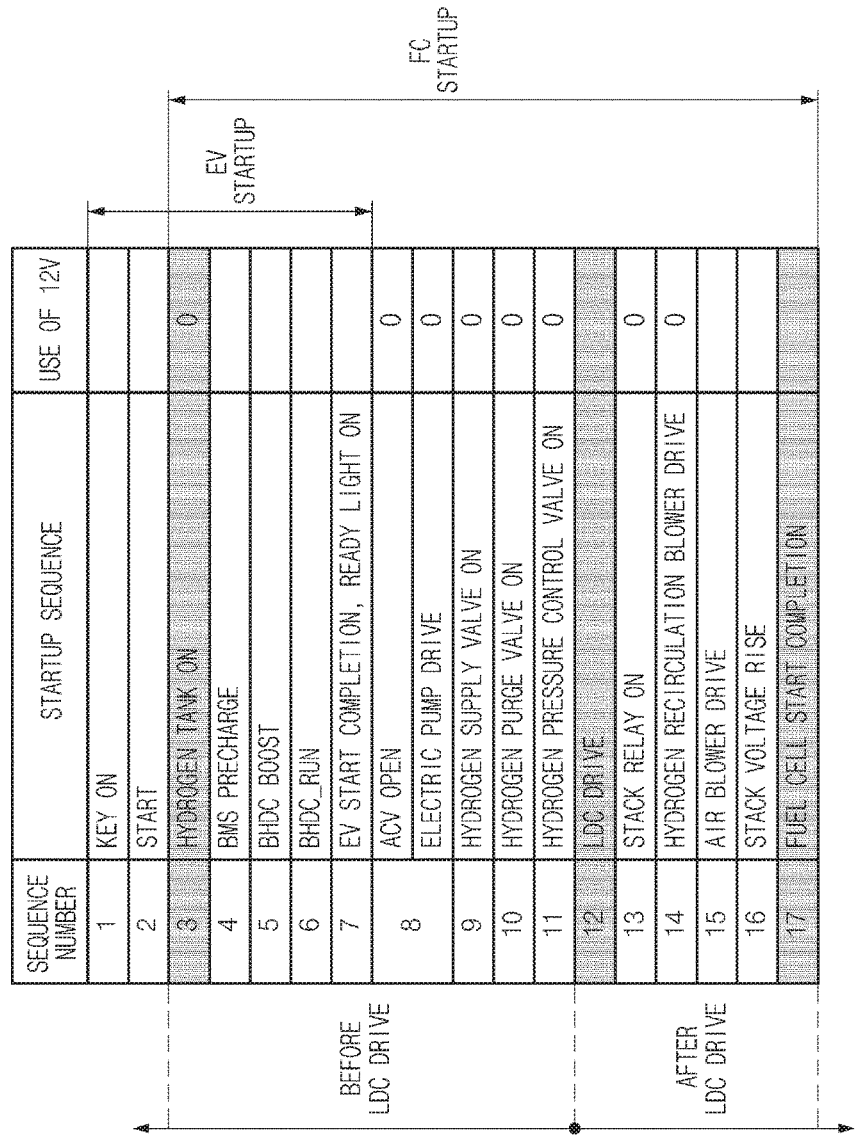

Referring to FIG. 2, the reference startup sequence may be defined as [1. Key ON->2. Start->3. Hydrogen Tank ON->4. Battery Management System (BMS) Pre-charge->5. By-Directional High Voltage DC-DC Converter (BHDC) Boost->6. BHDC RUN->7. EV Start Completion, Ready Light ON->8. Air Cutoff Valve (ACV) Open/Electric Pump Drive->9. Hydrogen Supply Valve ON->10. Hydrogen Purge Valve ON->11. Hydrogen Pressure Control Valve ON->12. Low-Voltage DC-DC Converter (LDC) Drive->13. Stack Relay ON->14. Hydrogen Recirculation Blower Drive->15. Air Blower Drive->16. Stack Voltage Rise->17. Fuel Cell Startup Completion].

In the reference startup sequence, numbers 3 to 7 correspond to the EV startup for driving the vehicle using a high-voltage battery. In addition, numbers 3 to 17 correspond to the FC startup for driving the vehicle using the fuel cell.

In this case, the hydrogen tank, the ACV, the electric pump, the hydrogen supply valve, the hydrogen purge valve, the hydrogen pressure control valve, the stack relay, the hydrogen recirculation blower, and the like are driven by using the power supply (12 V) having the same specification as that of the low-voltage battery.

In this case, if the voltage of the low-voltage battery is less than a certain voltage (a minimum required voltage), the startup may fail before the LDC is driven in sequence step number 12 due to a voltage drop.

Therefore, the startup controller 170 controls the driving of each driving unit and the LDC in the reference startup sequence only when the voltage of the low-voltage battery is equal to or higher than the predetermined reference voltage ($V_{Ref}$).

When the startup is completed in the reference start sequence, the learning module 180 confirms and stores a voltage drop amount of each driving unit, and compares the voltage drop amount of each driving unit with voltage drop amounts previously stored to learn an average voltage drop amount associated with the startup of each driving unit.

For example, the learning module 180 may measure the voltage drop amounts of the driving units, that is, the hydrogen tank, the ACV, the electric pump, the hydrogen supply valve, the hydrogen purge valve, and the hydrogen pressure control valve which are driven before the LDC is driven in the reference startup sequence, while the vehicle starts up N times, and may calculate the average value of each measured data value over the N start up times to learn the average voltage drop amount of the corresponding drive unit.

The result of learning from the voltage drop amount of each driving unit will be described with reference to an embodiment illustrated in FIG. 3.

As illustrated in FIG. 3, while the vehicle has started up (N−1) times in the past, the learning module 180 may store the average voltage drop amount (old) confirmed when the sequence of ⓐ Hydrogen Tank ON, ⓑ ACV Open, ⓒ Electric Pump Drive, ⓓ Hydrogen Supply Valve ON, ⓔ

Hydrogen Purge Valve ON, and ⓕ Hydrogen Pressure Control Valve ON is performed. Then, when the vehicle performs the N-th startup in the reference startup sequence, the learning module 180 may update the voltage drop amount (new) confirmed when the sequence of ⓐ Hydrogen Tank ON, ⓑ ACV Open, ⓒ Electric Field Pump Drive, ⓓ Hydrogen Supply Valve ON, ⓔ Hydrogen Purge Valve ON, and ⓕ Hydrogen Pressure Control Valve ON is performed to reflect the voltage drop amount (new) of the N-th startup on the previous average voltage drop amount (old) to calculate an average voltage drop amount.

In this case, the learning module 180 may determine and learn a voltage drop amount of 0.2 V in ⓐ Hydrogen Tank ON, a voltage drop amount of 0.1 V in ⓑ ACV Open, a voltage drop amount of 0.2 V in ⓒ Electric Pump Drive, a voltage drop amount of 0.1 V in ⓓ Hydrogen Supply Valve ON, a voltage drop amount of 0.1 V in ⓔ Hydrogen Purge Valve ON, and a voltage drop amount of 0.1 V in ⓕ Hydrogen Pressure Control Valve ON.

Thus, the total amount of average voltage drops, which is caused by each driving unit, that is, the hydrogen tank, the ACV, the electric pump, the hydrogen supply valve, the hydrogen purge valve, and the hydrogen pressure control valve driven before the LDC is driven, may be 0.8 V in the illustrative example of FIG. 3.

In this case, the learned voltage drop amount may be utilized to define a voltage range of the voltage level/classification of the low-voltage battery. The learning module 180 may reflect the confirmed voltage drop amount of each driving unit on the predefined voltage level/classification table of the low-voltage battery.

The voltage level/classification table of the low-voltage battery according to an embodiment will be described with reference to FIG. 4.

Referring to FIG. 4, the voltage of a low-voltage battery can be classified into one of several levels/classifications. The levels/classifications define distinct intervals that are based on the voltage range of the low-voltage battery when the voltage of the low-voltage battery is equal to or lower than the reference voltage.

For example, the voltage level/classification of the low-voltage battery may be classified into level 1, level 2, or level 3 based on the voltage range of the low-voltage battery.

The level 1 represents the voltage state before ⓕ Hydrogen Pressure Control Valve ON. Level 1 may be defined as $[(V_{Ref}-ⓕ\_voltage\ drop\ amount)<V\leq V_{Ref}]$. When it is assumed that the voltage drop amount in ⓕ Hydrogen Pressure Control Valve ON is 0.1 V (e.g., as in FIG. 3) and the reference voltage ($V_{Ref}$) is 10.5 V, the voltage range corresponding to the level 1 of the low-voltage battery may be expressed as [10.4 V<V≤10.5 V].

The level 2 represents the voltage state before ⓓ Hydrogen Supply Valve ON. Level 2 may be defined as $[(V_{Ref}-(ⓓ+ⓔ+ⓕ)\_voltage\ drop\ amount)<V\leq (V_{Ref}-ⓕ\_voltage\ drop\ amount)]$. In accordance with the illustrative values shown in FIG. 3, when it is assumed that the voltage drop amount in ⓓ Hydrogen Supply Valve ON is 0.1 V, the voltage drop amount in ⓔ Hydrogen Purge Valve ON is 0.1 V, the voltage drop amount in ⓓ Hydrogen Pressure Control Valve ON is 0.1 V, and the reference voltage ($V_{Ref}$) is 10.5 V, the voltage range corresponding to the level 2 of the low-voltage battery may be expressed as [10.2 V<V≤10.4 V].

The level 3 represents the voltage state before ⓑ ACV Open. Level 3 may be defined as $[(V_{Ref}-(ⓑ+ⓒ+ⓓ+ⓔ+ⓕ)\_voltage\ drop\ amount)<V\leq (V_{Ref}-(ⓓ+ⓔ+ⓕ)\_voltage\ drop\ amount)]$. In accordance with the illustrative values shown in FIG. 3, when it is assumed that the voltage drop amount in ⓑ ACV Open is 0.1 V, the voltage drop amount in ⓒ Electric Pump Drive is 0.2 V, the voltage drop amount in ⓓ Hydrogen Supply Valve ON is 0.1 V, the voltage drop amount in ⓔ Hydrogen Purge Valve ON is 0.1 V, the voltage drop amount in ⓕ Hydrogen Pressure Control Valve ON is 0.1 V, and the reference voltage ($V_{Ref}$) is 10.5 V, the voltage range corresponding to the level 3 of the low-voltage battery may be expressed as [9.9 V<V≤10.2 V].

Of course, although an embodiment in which the voltage of the low-voltage battery is classified into one of three levels is shown in FIG. 4, the disclosure is not limited thereto. The number of voltage levels/classifications may be increased or decreased depending on the type and/or the number of driving units applied, and the particular voltage values discussed herein are provided only for illustrative purposes.

Meanwhile, when the voltage (V) of the low-voltage battery is less than the predetermined reference voltage ($V_{Ref}$), the voltage state determination module 150 may determine whether the voltage (V) of the low voltage battery corresponds to the voltage range of a predefined voltage level or classification (e.g., from among levels 1, 2, and 3 described in relation to FIG. 4).

In this case, the voltage state determination module 150 may read the voltage level/classification table stored in the storage 140 and may identify the voltage level/classification corresponding to the voltage range within which the current voltage of the low-voltage battery is included based on the voltage level/classification table. The voltage level/classification table according to one illustrative embodiment is shown in FIG. 4.

For example, the voltage state determination module 150 may determine whether the voltage (V) of the low-voltage battery corresponds to the voltage range of level 1 defined in the voltage level/classification table, that is, [10.4 V<V≤10.5 V]. In addition, the voltage state determination module 150 may determine whether the voltage (V) of the low-voltage battery corresponds to the voltage range of level 2 defined in the voltage level/classification table, that is, [10.2 V<V≤10.4 V]. In addition, the voltage state determination module 150 may determine whether the voltage (V) of the low-voltage battery corresponds to the voltage range of level 3 defined in the voltage level/classification table, that is, [9.9 V<V≤10.2 V].

If the voltage (V) of the low-voltage battery is lower than that in the voltage range of level 3, the voltage state determination module 150 may output a low-voltage (or battery low) message.

The driving time point determination module 160 confirms the voltage level/classification corresponding to the voltage (V) of the low-voltage battery based on the determination result of the voltage state determination module 150 and determines the driving time point of the LDC based on the confirmed voltage level/classification.

Therefore, the startup controller 170 generally controls the driving (or startup) of each driving unit in the order defined in the startup sequence. However, the startup controller 170 may alter the startup sequence to move the time point at which the LDC is driven to occur sooner in the sequence based on the voltage level/classification determined by the driving time point determination module 160. The startup controller 170 then controls the driving of the LDC according to the altered startup sequence.

An example of the altered startup sequence in which the time point at which the LDC is driven (or started up) occurs sooner depending on the voltage level/classification is illustrated in FIG. 5.

Referring to FIG. 5, when the confirmed voltage level/classification is level 1, the driving time point determination module 160 may determine to drive the LDC before the time point when the hydrogen pressure control valve is turned on. In this case, the LDC driving sequence order of number 12 may be changed to the sequence order of number 11. The sequence order of turning on the hydrogen pressure control valve of number 11 may be changed to the sequence order of number 12.

Therefore, the startup controller 170 performs the first to tenth sequences and drives the LDC before turning on the hydrogen pressure control valve.

Meanwhile, when the confirmed voltage level/classification is level 2, the driving time point determination module 160 may determine to drive the LDC before the time point when the hydrogen supply valve is turned on. In this case, the LDC driving sequence order of number 12 may be changed to the sequence order of number 9, and the sequence orders of numbers 9 to 11 may be shifted backward one by one to be changed to the sequence orders of numbers 10 to 12.

Therefore, the startup controller 170 performs the sequences of number 1 to 8-2 and drives the LDC before turning on the hydrogen supply valve (and before further steps are performed).

Meanwhile, when the confirmed voltage level/classification is level 3, the driving time point determination module 160 may determine to drive the LDC before the time point when the ACV Open is performed. In this case, the LDC driving sequence order of number 12 may be changed to the sequence order of number 8, and the sequence orders of numbers 8-1 to 11 may be shifted backward one by one to be changed to the sequence orders of numbers 9-1 to 12.

Therefore, the startup controller 170 performs the sequences of number 1 to 7 and drives the LDC before the ACV Open is performed (and before further steps are performed).

As described above, the startup control apparatus 100 according to the present disclosure variably sets the driving order of the LDC based on the voltage (V) of the low-voltage battery, so that it is possible to prevent the startup time from being increased due to a startup failure caused by the voltage drop due to the driving of each driving unit.

Hereinafter, the operation of the apparatus configured according to the present disclosure will be described in more detail.

Figure 6:
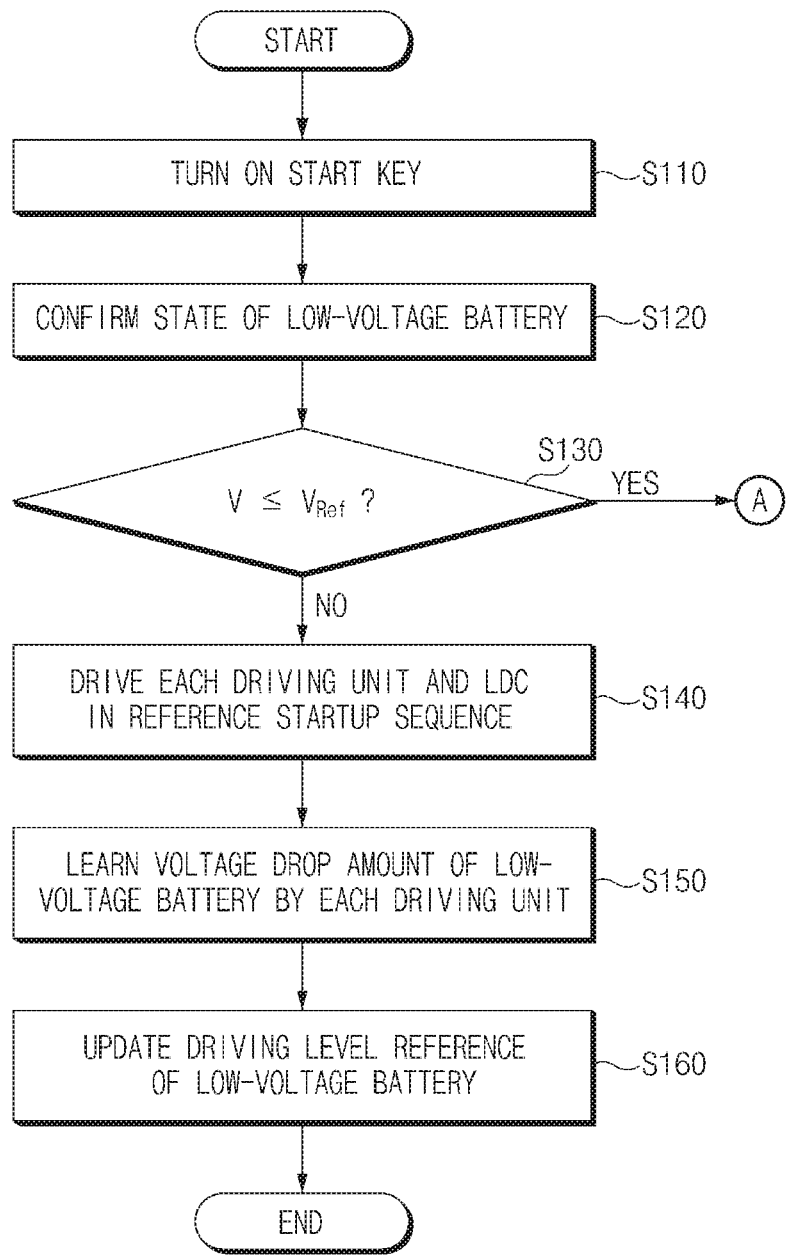
FIGS. 6 and 7 are flowcharts illustrating a method for controlling vehicle start-up according to an embodiment of the present disclosure.
Figure 7:
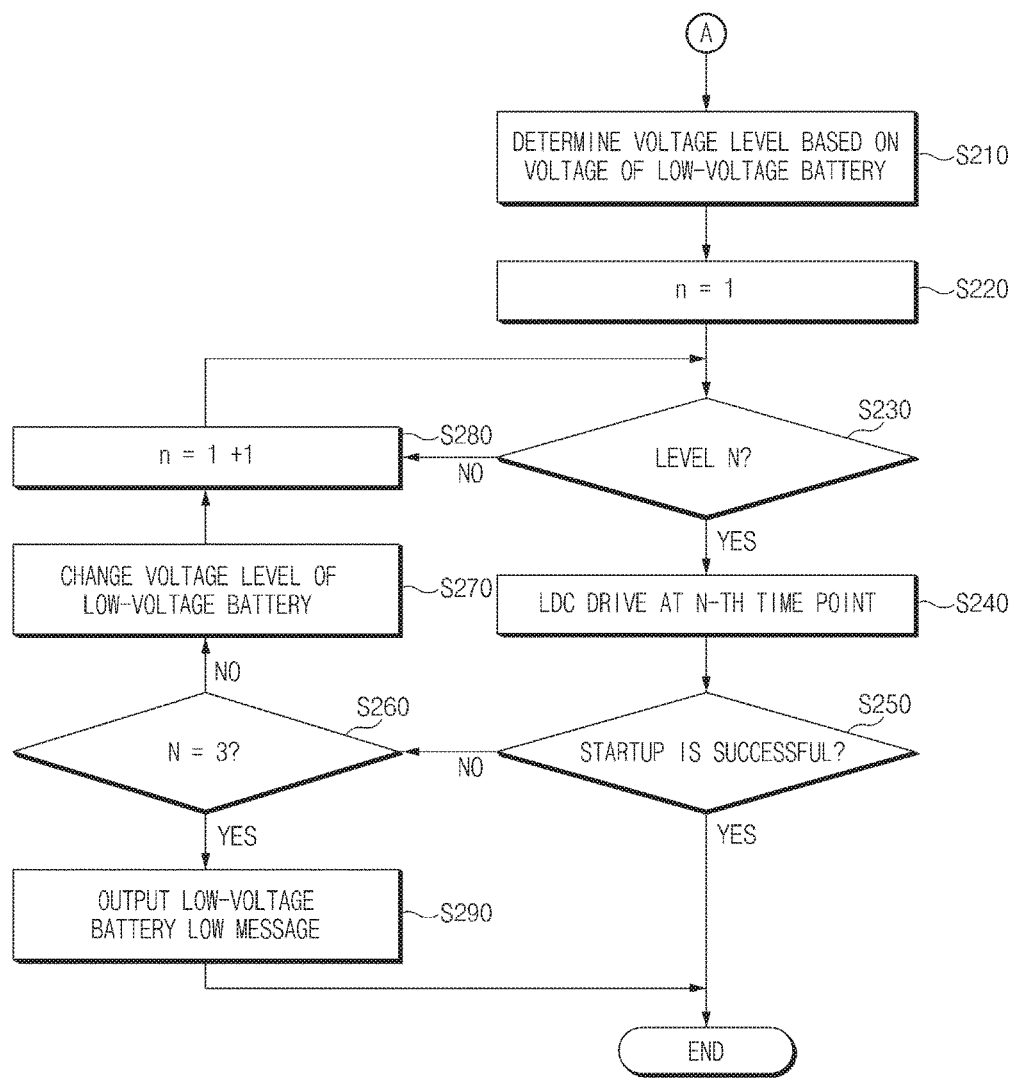

FIGS. 6 and 7 are flowcharts illustrating a method for controlling vehicle start-up according to an embodiment of the present disclosure.

First, FIG. 6 illustrates a flowchart illustrating an operation of learning the voltage drop amount of each drive unit at the start according to the reference start sequence.

Referring to FIG. 6, when the start key is turned on in operation S110, the startup control apparatus 100 confirms the voltage state of the low-voltage battery in operation S120 for example by obtaining a measurement of the voltage of the low-voltage battery.

It is determined whether the voltage (V) of the low-voltage battery confirmed in operation S120 is less than or equal to the predetermined reference voltage ($V_{Ref}$). If the voltage (V) of the low-voltage battery is not less than or equal to the reference voltage ($V_{Ref}$), the startup control apparatus 100 controls driving of each driving unit and the LDC in the order defined in the predefined reference start sequence in operation S140.

In operation S150, when startup is completed in the reference startup sequence, the startup control apparatus 100 confirms and learns the voltage drop amount of the low-voltage battery for each drive unit in the startup sequence. In this case, the startup control apparatus 100 calculates the average voltage drop amount by reflecting the voltage drop amount confirmed in operation S150 on the learned voltage drop amount while the vehicle startup is performed N−1 times, and learns the voltage drop amount of the corresponding driving unit.

In this case, the startup control apparatus 100 may update the voltage level reference of the low-voltage battery based on the voltage drop amount of each driving unit learned in operation S150. In detail, the startup control apparatus 100 may update the voltage range corresponding to the voltage level/classification of the low-voltage battery based on the learned voltage drop amount of each driving unit.

Meanwhile, when it is determined in operation S130 that the voltage (V) of the low-voltage battery is less than or equal to the reference voltage ($V_{Ref}$), the startup control apparatus 100 performs operations after (A) as shown in FIG. 7.

Referring to FIG. 7, when the voltage of the low-voltage battery is less than or equal to the reference voltage ($V_{Ref}$), the startup control apparatus 100 determines the appropriate voltage level/classification based on the voltage of the low-voltage battery in operation S210.

In operation S210, the startup control apparatus 100 may read the voltage level/classification table in which the classification levels corresponding to the voltage ranges are defined and may determine the classification level corresponding to the voltage of the low-voltage battery based on the read voltage level/classification table.

In operations S220, S230 and S240, when the voltage level/classification determined in operation S210 is level 1, the startup control apparatus 100 drives the LDC before a first time point defined corresponding to level 1, for example, before performing the operation of the hydrogen pressure control valve ON.

Then, if the startup is successful in operation S250, the startup control apparatus 100 ends a related operation.

Meanwhile, when it is determined in operation S250 that the startup is failed, the startup control apparatus 100 changes the voltage level/classification of the low-voltage battery from level 1 to level 2 in operation S270.

In operations S280, S230, and S240, when the voltage level/classification is level 2, the startup control apparatus 100 drives the LDC before the second time point defined corresponding to level 2, for example, before performing the operation of the hydrogen supply valve ON.

Then, if the startup is successful in operation S250, the startup control apparatus 100 ends a related operation.

Meanwhile, when it is determined in operation S250 that the startup is failed, the startup control apparatus 100 again changes the voltage level/classification of the low-voltage battery from level 2 to level 3 in operation S270.

In operation S280, S230, and S240, when the voltage level/classification is level 3, the startup control apparatus 100 drives the LDC before the third time point defined corresponding to level 3, for example, before performing the operation of the ACV Open.

Then, if the startup is successful in operation S250, the startup control apparatus 100 ends a related operation.

Meanwhile, if the start-up control apparatus 100 fails to start the vehicle after driving the LDC by level 3 in operations S250 and S260, the start-up control apparatus 100 may determine that the charged energy of the low-voltage battery is insufficient so that the start-up control apparatus 100 outputs the low-voltage battery low message in operation S290 and may end the related operations.

As described above, the startup control device 100 according to an embodiment of the present disclosure may be implemented as an independent hardware device, and may be implemented in the form of at least one processor included in another hardware apparatus such as a microprocessor or a general purpose computer system.

Figure 8:
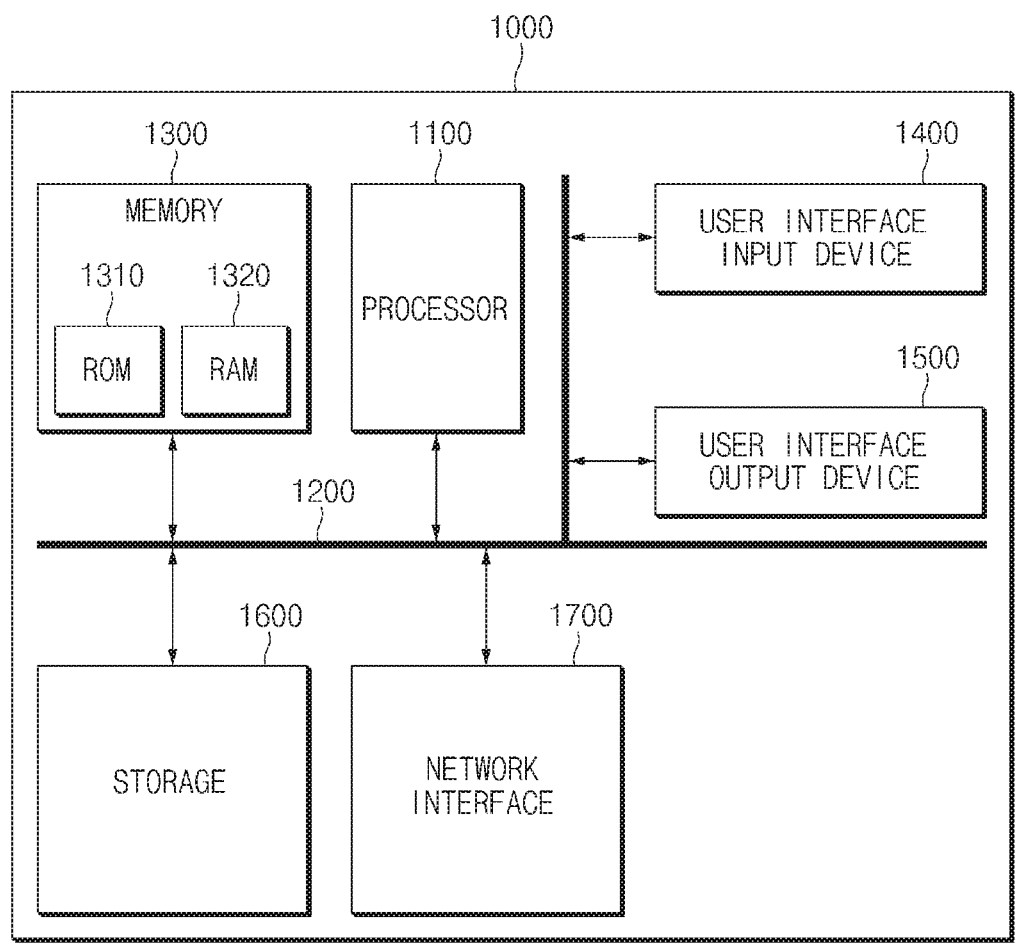
FIG. 8 is a block diagram illustrating a computer system or platform using which a method according to an embodiment of the present disclosure can be executed.

FIG. 8 is a view illustrating a computer system by which a method according to an embodiment of the present disclosure is executed.

Referring to FIG. 8, a computing system 1000 may include at least one processor 1100, a memory 1300, a user interface input device 1400, a user interface output device 1500, a storage 1600 (e.g., a non-transitory memory storing program instructions), and a network interface 1700, which are connected to each other through a communication bus 1200.

The processor 1100 may be a central processing unit (CPU) or a semiconductor device which performs processing of instructions stored in the memory device 1300 and/or the storage 1600. The memory 1300 and the storage 1600 may include various types of volatile or non-volatile storage media. For example, the memory 1300 may include a read only memory (ROM) and a random access memory (RAM).

The operations of a method or algorithm described in connection with the embodiments disclosed herein may be embodied directly in hardware, in a software module executed by the processor 1100, or in a combination of the two. The software module may reside in a storage medium (that is, the memory 1300 and/or the storage 1600) such as a random access memory (RAM), a flash memory, a read only memory (ROM), an erasable programmable ROM (EPROM), an electrically erasable programmable ROM (EEPROM), registers, hard disk, a removable disk, a compact disc-ROM (CD-ROM), or the like. An exemplary storage medium is coupled to the processor 1100 such that the processor 1100 may read information from and write information to the storage medium. Alternatively, the storage medium may be integrated into the processor 1100. The processor and the storage medium may reside in an ASIC. The ASIC may reside within a user terminal. Alternatively, the processor and the storage medium may reside in the user terminal as individual components.

According to the present disclosure, the driving time point of a power conversion device (LDC) may be determined based on the voltage level/classification of a low-voltage battery in a low state of the low-voltage battery and the LDC may be driven at the determined time point in advance, thereby compensating for the increase in startup time.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of description, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling vehicle start-up, the apparatus comprising:
a vehicle communication interface supporting communication between a vehicle controller and components of a vehicle; and
a processor communicatively connected to the vehicle communication interface and configured to:
determine, based on low-voltage battery information received through the vehicle communication interface, whether a voltage of a low-voltage battery is less than or equal to a reference voltage when a start key is turned on;
determine a voltage classification level corresponding to the voltage of the low-voltage battery when the voltage of the low-voltage battery is less than or equal to the reference voltage;
determine a driving time point of a power conversion device based on the determined voltage classification level; and
control startup of the vehicle in accordance with the determined driving time point of the power conversion device.

2. The apparatus of claim 1, wherein the processor determines the voltage classification level of the low-voltage battery by comparing a voltage drop amount of each of a plurality of driving units of the vehicle driven ahead of the power conversion device in a reference startup sequence with the voltage of the low-voltage battery when the voltage of the low-voltage battery is less than the reference voltage.

3. The apparatus of claim 2, wherein the processor determines the voltage classification level of the low-voltage battery by comparing a voltage range in a voltage level/classification table defined based on the voltage drop amount of each of the plurality of driving units with the voltage of the low-voltage battery.

4. The apparatus of claim 3, wherein the voltage level/classification table includes two or more voltage ranges determined based on a result of learning the voltage drop amount of each driving unit, and the voltage level/classification table associates voltage levels/classifications with each of the two or more voltage ranges.

5. The apparatus of claim 3, wherein, when the vehicle is attempted to be started based on the determined voltage classification level, the processor sets the voltage classification level of the low-voltage battery to a voltage classification level corresponding to a lower voltage range when it is determined that startup of the vehicle has failed.

6. The apparatus of claim 2, wherein the processor sets a driving sequence order of the power conversion device defined in the reference startup sequence, based on the driving time point of the power conversion device determined based on the voltage classification level.

7. The apparatus of claim 2, wherein each driving unit is driven by using power of the low-voltage battery when the vehicle starts up.

8. The apparatus of claim 1, wherein the processor controls driving of each driving unit and the power conversion device based on a sequence order defined in a reference startup sequence when the voltage of the low-voltage battery is higher than the reference voltage.

9. The apparatus of claim 1, wherein the processor is further configured to:

learn a voltage drop amount of each driving unit by calculating an average voltage drop amount associated with startup of each driving unit while the vehicle starts up over a predetermined number of times.

10. The apparatus of claim 9, wherein the processor determines the voltage drop amount of each driving unit that is driven at each startup of the vehicle and computes the average voltage drop amount of each driving unit by reflecting the determined voltage drop amount of each driving unit on the previously learned voltage drop amount of each driving unit when the startup of the vehicle is completed based on the reference start sequence.

11. A method of controlling vehicle start-up, the method comprising steps of:
determining, by a processor communicatively connected to a vehicle communication interface supporting communication between a vehicle controller and components of a vehicle, whether a voltage of a low-voltage battery is less than or equal to a reference voltage when a start key is turned on;
determining, by the processor, a voltage classification level corresponding to the voltage of the low-voltage battery when the voltage of the low-voltage battery is less than or equal to the reference voltage;
determining, by the processor, a driving time point of a power conversion device based on the determined voltage classification level; and
controlling, by the processor, startup of the vehicle in accordance with the determined driving time point of the power conversion device.

12. The method of claim 11, wherein the step of determining the driving time point of the power conversion device includes:
determining the voltage classification level by comparing a voltage drop amount of each of a plurality of driving units of the vehicle driven ahead of the power conversion device in a reference startup sequence with the voltage of the low-voltage battery when the voltage of the low-voltage battery is less than the reference voltage.

13. The method of claim 12, wherein the determining of the voltage classification level corresponding to the voltage of the low-voltage battery includes:
determining the voltage classification level by comparing a voltage range in a voltage level/classification table defined based on the voltage drop amount of each of the plurality of driving units with the voltage of the low-voltage battery.

14. The method of claim 13, wherein the voltage level/classification table includes two or more voltage ranges determined based on a result of learning the voltage drop amount of each driving unit, and the voltage level/classification table associates voltage levels/classifications with each of the two or more voltage ranges.

15. The method of claim 13, further comprising a step of:
when the vehicle is attempted to be started based on the determined voltage classification level, setting, by the processor, the voltage classification level of the low-voltage battery to a voltage classification level corresponding to a lower voltage range when it is determined that startup of the vehicle has failed.

16. The method of claim 12, wherein the step of determining the driving time point of the power conversion device further includes:
setting a driving sequence order of the power conversion device defined in the reference startup sequence, based on the driving time point of the power conversion device determined based on the voltage classification level.

17. The method of claim 12, wherein each driving unit is driven by using power of the low-voltage battery when the vehicle starts up.

18. The method of claim 11, further comprising:
controlling driving of each driving unit and the power conversion device based on a sequence order defined in a reference startup sequence when the voltage of the low-voltage battery is higher than the reference voltage.

19. The method of claim 11, further comprising a step of:
learning, by the processor, a voltage drop amount of each driving unit by calculating an average voltage drop amount associated with startup of each driving unit while the vehicle starts up over a predetermined number of times.

20. The method of claim 19, wherein the step of learning the voltage drop amount includes:
determining the voltage drop amount of each driving unit that is driven at each startup of the vehicle and computing the average voltage drop amount of each driving unit by reflecting the determined voltage drop amount of each driving unit on the previously learned voltage drop amount of each driving unit when the startup of the vehicle is completed based on the reference start sequence.

21. A method for controlling start-up of a vehicle comprising:
receiving, in a processor through a vehicle communication interface, a voltage measurement of a low-voltage battery of the vehicle;
adjusting, in the processor, a sequence order for startup of driving units of the vehicle based on the received voltage measurement; and
controlling, by the processor through the vehicle communication interface, startup of the driving units of the vehicle in the adjusted sequence order.

22. The method of claim 21, wherein the adjusting the sequence order comprises moving startup of a power conversion device earlier in the sequence order when the received voltage measurement is less than a predetermined reference voltage.

23. The method of claim 21, wherein the adjusting the sequence order comprises:
determining whether the received voltage measurement falls within a first voltage range or within a second voltage range different from the first voltage range; and
setting the sequence order to a first sequence order upon determining that the received voltage measurement falls within the first voltage range; and
setting the sequence order to a second sequence order different from the first sequence order upon determining that the received voltage measurement falls within the second voltage range.

24. The method of claim 21, wherein the controlling startup of the driving units of the vehicle comprises controlling startup of the driving units of the vehicle using power of the low-voltage battery of which the voltage measurement is received.

25. The method of claim 21, further comprising:
upon determining that startup of the vehicle has failed in the adjusted sequence order, performing steps of readjusting the sequence order for startup of driving units of the vehicle to move startup of a power conversion device earlier in the readjusted sequence order than in the adjusted sequence order, and controlling startup of the driving units of the vehicle in the readjusted sequence order.

* * * * *